United States Patent [19]
Emrich

[11] 4,365,748
[45] Dec. 28, 1982

[54] SELF-DRIVEN MOBILE CENTER PIVOT IRRIGATION SYSTEM

[76] Inventor: Robert R. Emrich, Box J, Indianola, Nebr. 69034

[21] Appl. No.: 191,173

[22] Filed: Sep. 26, 1980

[51] Int. Cl.³ .............................................. B05B 3/12
[52] U.S. Cl. ................................... 239/177; 239/710; 239/721
[58] Field of Search ............... 239/177, 709, 710, 721, 239/DIG. 1, 191, 192

[56] References Cited

U.S. PATENT DOCUMENTS

| | | | |
|---|---|---|---|
| 3,662,776 | 5/1972 | Bryant et al. | 239/710 |
| 3,811,617 | 5/1974 | Cornelius | 239/721 |
| 3,817,455 | 6/1974 | Cornelius | 239/177 |
| 3,993,249 | 11/1976 | Hieb | 239/177 |
| 4,099,669 | 7/1978 | Cortopassi | 239/177 |
| 4,184,639 | 1/1980 | Miller | 239/177 |
| 4,240,584 | 12/1980 | Courtright | 239/191 |
| 4,242,712 | 12/1980 | Doll | 239/177 |

Primary Examiner—Andres Kashnikow
Assistant Examiner—Michael J. Forman
Attorney, Agent, or Firm—Zarley, McKee, Thomte, Voorhees & Sease

[57] ABSTRACT

A mobile center-pivot irrigation unit capable of irrigating small and irregularly-shaped fields is disclosed. The unit has two wheel-mounted irrigation carriages which support a single irrigation pipeline which is suspended between the two carriages. The first carriage is a lightweight steerable tractor with a pivot attachment mounted on its frame. The second carriage has two pivoting wheels which lock into position, thereby allowing the carriage to be either towed by the tractor, or to move in a circle about the tractor and pivot point. The unit is capable of being driven from field to field by a single operator and may be connected to a variety of irrigation water sources. Once connected to a water source, the second carriage wheels are repositioned and a water turbine powers the second carriage in a circular path about the first carriage as the unit sprays irrigation water onto the field.

5 Claims, 7 Drawing Figures

SELF-DRIVEN MOBILE CENTER PIVOT IRRIGATION SYSTEM

BACKGROUND OF THE INVENTION

In recent years, center pivot systems have come into wide-spread use as very effective means for irrigating farm land. A center pivot irrigation system consists generally of a single pipeline extending radially from a fixed center pivot point. Irrigation water is introduced into the pipeline at the pivot point and is dispersed through sprinklers spaced along the length of the pipeline. The irrigation pipeline is supported on a series of wheel mounted carriages with associated drive motors. The motion of the carriages causes the irrigation pipeline to revolve about the center pivot point, thus, causing the pipeline to traverse and irrigate a large circular area within a field.

The benefit of center pivot irrigation systems over prior irrigation systems is that large tracts of land can be efficiently irrigated with relatively little equipment and little manual labor. However, a drawback of the system has been that only large and symmetrically-shaped fields may be irrigated. A problem also exists with moving center pivot irrigatin systems from one field to another. Because of the large number of towers and the positioning of the wheels on these towers to accommodate circular motion, it is necessary, generally, to dismantle the system entirely in order to move it from one field to another. Although it would be possible to use a number of small center pivot irrigation systems to water irregularly shaped fields, the expense of maintaining and operating such multiple systems would outweigh the benefits, since the amount of equipment required would greatly exceed the amount of equipment necessary to cover a comparable area of ground in a larger field with a single center pivot irrigation system.

One solution to the problem of irrigating small and irregular fields is to use a single mobile center pivot irrigation system that is sufficiently small to operate within the irregular portions of a field and which may be connected to a number of different water supply points within each field. To be feasible, such a system must be readily transferable from one point to another, and therefore, must be adapted to linear movement as well as circular movement about the center pivot point.

A number of inventions as described below have dealt with this problem; however, none have, to date, provided a satisfactory solution.

ART STATEMENT

Cornelius U.S. Pat. No. 3,817,455 describes a movable support collar for attachment to the pivot end of a center pivot irrigation pipeline which is to be towed by a conventional farm tractor.

Zimmerer, et al., U.S. Pat. No. 3,730,435 discloses a center pivot irrigation system wherein the wheels mounted on each center pivot irrigation tower may be pivoted 90° to allow the irrigation system to be towed longitudinally.

Linder, et al., U.S. Pat. No. 3,999,569 describes means for pivoting the wheels of an irrigation tower to allow precise adjustment to the desired circular path about the center pivot.

Hegemann U.S. Pat. No. 4,163,459 discloses the use of a moveable center pivot tower in a center pivot irrigation system. The axis of the wheels of the pivot tower are perpendicular to the longitudinal axis of the pipeline. One of the wheels is pivotally mounted on the frame and may be anchored to the ground to provide a pivot point about which the center pivot tower may rotate. Wheels on the irrigation towers may also be pivoted for longitudinal movement.

In G. H. Strong U.S. Pat. No. 3,472,456 a mobile spraying apparatus is described which is mounted on a single platform to be pulled by a tractor. Liquid contained in a drum is pumped through hoses which are rotated about a center pivot and maintained in position by centrifugal force. The hoses may be varied in length.

Purtell U.S. Pat. No. 3,888,281 discloses a linear, pull-type, wheeled irrigation system that is pulled by a conventional tractor.

Of the invention described above, only the non-center pivot units could be considered truly mobile. The inventions dealing with center pivot systems necessarily have a very restricted range of movement. Because of the large size of the center pivot systems, it appears that most of the inventions were intended for only limited linear movement of the system, probably within the same field. Clearly, if any long distance moves were anticipated, it would be necessary to dismantle the irrigation system to accomplish the move. It would also be necessary, for all of the inventions involving a center pivot system, to use a farm tractor or similar vehicle to tow the system from one point to another. It would, therefore, be necessary to drive a heavy vehicle onto the field, thereby crushing growing crops and disturbing the land whenever the system was to be moved. In many situations, it is necessary to use heavy tow cables with the towing vehicle, and the cables cause added damage to growing crops.

The present invention overcomes these problems by providing a small self-contained center-pivot irrigation system which is easily driven to various points on a field or to various different fields without the use of heavy farm equipment.

SUMMARY OF THE INVENTION

The present invention consists of a single span of irrigation pipe mounted on two wheeled carriages. The first carriage has a tricycle-like construction with a single motor-driven drive wheel in the front. The drive wheel may be guided by means of a simple steering mechanism and has an attached platform to accommodate an operator. The center pivot coupling is mounted at the center of the tricycle-like structure and accommodates an irrigation pipe which may rotate freely in the horizontal plane about the coupling. The irrigation pipe is connected at its opposite end to a two-wheeled carriage with pivoting wheel axles. The two-wheeled carriage may thus move either radially or tangentially with respect to the irrigation pipeline depending upon the positioning of the wheels. In the irrigation mode, the wheels of the two-wheeled carriage will be locked in position so that the direction of travel is perpendicular to the axis of the irrigation pipeline. In the mobile mode, the wheels of the carriage will be locked in position, so that the direction of travel of the carriage is parallel to the axis of the irrigation pipeline. The two-wheeled carriage may be driven by any conventional means while in the irrigation mode. In the preferred embodiment, the drive means in the two-wheeled carriage is disconnected during movement of the system from one point to another and the power source mounted on the three-wheeled carriage is used as the single drive means.

However, in alternative embodiments, it would be possible to use the drive means within the two-wheeled carriage to provide motion in both the irrigation mode and the mobile mode. Sprinklers distributed along the pipeline disburse irrigation water onto the ground to be irrigated, and an end gun mounted on a boom at the non-pivoting end of the irrigation pipe may be used to increase the radius of coverage of the system.

Accordingly, it is the primary object of the present invention to provide a center pivot irrigation system which is easily driven by an operator from one area to be irrigated to another.

It is a further objct of the invention to provide a center pivot irrigation system which may be used to irrigate small and irregular fields.

It is a further object of the invention to provide a center pivot irrigation system which is light in weight.

It is a further object of the invention to provide a center pivot irrigation system which may be easily attached to a number of different irrigation water sources.

It is a further object of the invention to provide a center pivot irrigation system which may be moved from one field to another field without being dismantled.

It is a further object of the invention to provide a center pivot irrigation system which moves longitudinally as well as circularly.

It is a further object of the invention to provide a center pivot irrigation system which has pivoting wheels on at least one of the irrigation carriages.

It is a further object of the invention to provide a center pivot irrigation system which is safe to operate.

It is a further object of the invention to provide a center pivot irrigation system which is easy and economical to operate.

It is a further object of the invention to provide a center pivot irrigation system which may be used on hilly and uneven land.

A BRIEF DESCRIPTION OF THE DRAWINGS

DESCRIPTION OF THE PREFERRED EMBODIMENTS

Figure 1:
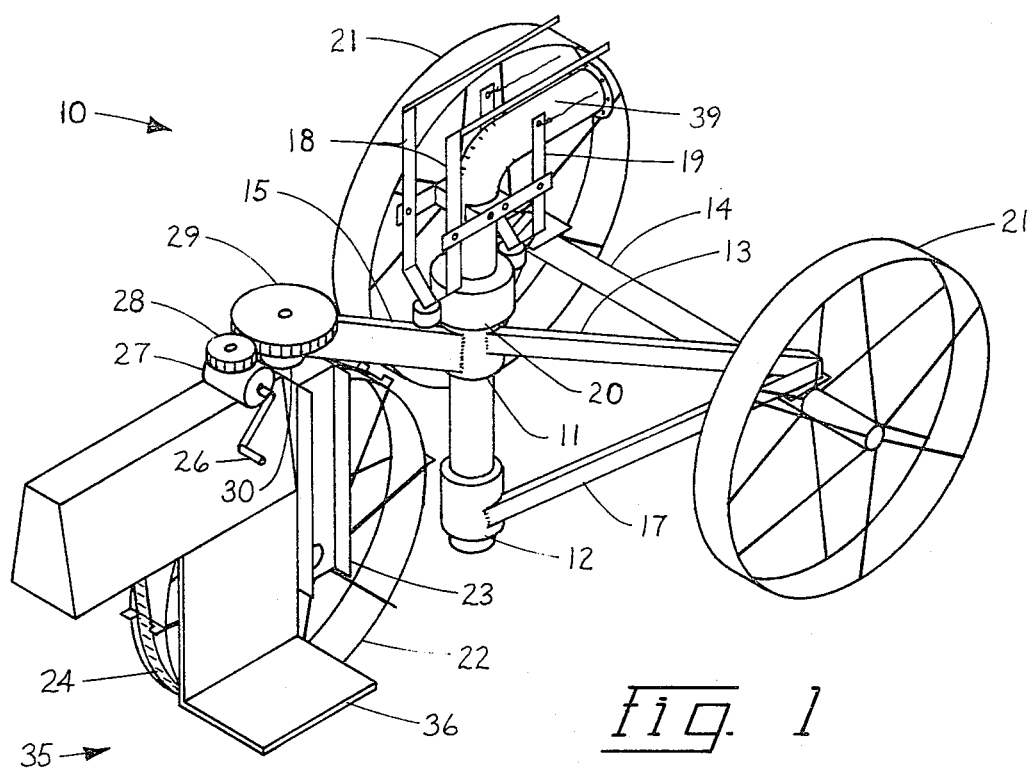
FIG. 1 is a perspective view of the self-driven mobile center pivot.
Figure 3:
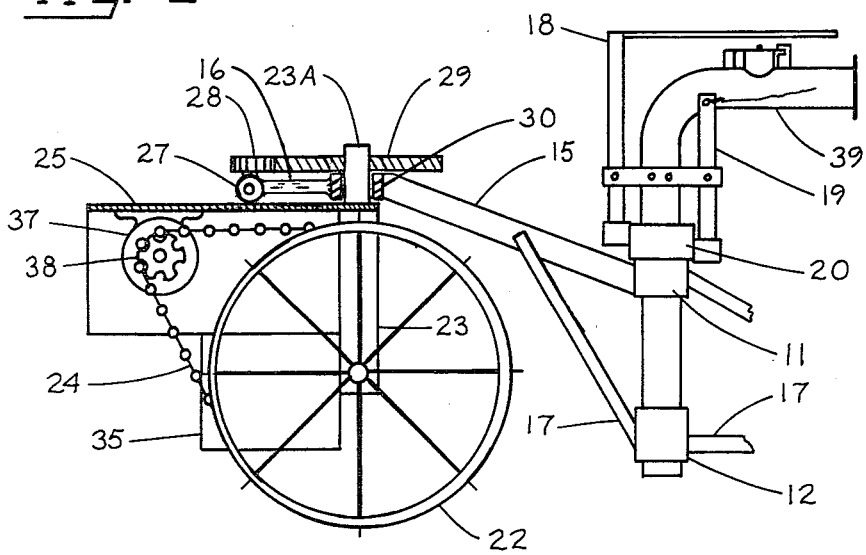
FIG. 3 is a cut-away side view of the self-driven mobile center pivot.

It can be seen from FIG. 1 that the self-driven mobile center pivot consists of a three-wheeled carriage with two undriven wheels 21 and a single drive wheel 22 mounted on a rigid metal frame. An upper pivot sleeve 11 is mounted within the frame and is supported by drive wheel connecting member 15 and upper elongate structural members 13 to which it is welded or otherwise rigidly attached by conventional means well known in the art. The upper pivot sleeve 11 is a metal pipe section with an internal radius slightly larger than that of L-shaped irrigation piping section 39. As shown in FIGS. 1 and 3, a lower pivot sleeve 12 is positioned a few feet below the upper pivot sleeve 11 and is supported by four lower elongate structural members 17 to which the lower pivot sleeve 12 is welded or otherwise rigidly attached. The lower pivot sleeve 12 has an internal radius identical to that of the upper pivot sleeve 11; thus holding the lower section of the L-shaped irrigation piping section in rotatabe sliding contact. A collar (not shown) located on the L-shaped irrigation piping section in sliding contact with the upper surface of the upper pivot sleeve 11 maintains the L-shaped piping section 39 in the proper vertical position. A cross member 14 is rigidly attached at either end to upper elongate structural members 13 and lower elongate structural members 17 as shown in FIG. 1. Rear wheels 21 are rotatably mounted by conventional means well known in the art to either end of cross member 14. The rear wheels 21, as well as all other carriage wheels 41 and 22 discussed herein, are of a spoke and rim construction discussed in Emrich patent application Ser. No. 129,088 which is hereby incorporated as though fully set forth herein. The upper pivot sleeve 11 is structurally attached to front wheel fork sleeve 30 by means of the drive wheel connecting member 15 to which front wheel fork sleeve 30 is welded or otherwise rigidly attached.

As shown by FIG. 3, the branch section 23A of the front wheel fork 23 has a cylindrical shape and is rotatably mounted within front wheel fork sleeve 30. A large sprocket 29 is mounted on the upper end of the branch section 23A of the front wheel fork 23 where it extends above the front wheel fork sleeve 30. The large sprocket 29 meshes with a small sprocket 28 which is drivingly connected to a gear box 27 which is, in turn, connected to a hand crank 26. A sufficient gearing ratio is thereby obtained to allow a manual operator to easily steer front wheel 22 which is rotatably mounted within the wheel fork 23. The reduction gear box 27 is rigidly attached to front wheel fork sleeve 30 by structural housing 16. As may be seen from FIGS. 1 and 3, motor housing 25 is rigidly attached to the front wheel fork 23 by welding, bolting or other attachment means well known in the art. A drive motor 37 is conventionally attached within the motor housing 25 as shown in FIG. 3. A drive sprocket 38 which is rotatably connected to the motor gear train (not shown) drivingly engages the front wheel drive chain 24 which is positioned about the periphery of drive wheel 22. A fuller description of the drive chain mechanism may be found in Emrich application Ser. No. 129,088 as discussed and incorporated above.

As shown by FIG. 1 and FIG. 3, riding step structure 35 is attached to one side of the motor housing 25 by welding, bolting or other attachment means. Folding step 36 is so hinged to the riding step structure 35 so as to allow the step 36 to be folded down into horizontal position to accommodate an operator during operation of the irrigation system in the mobile mode.

Figure 2:
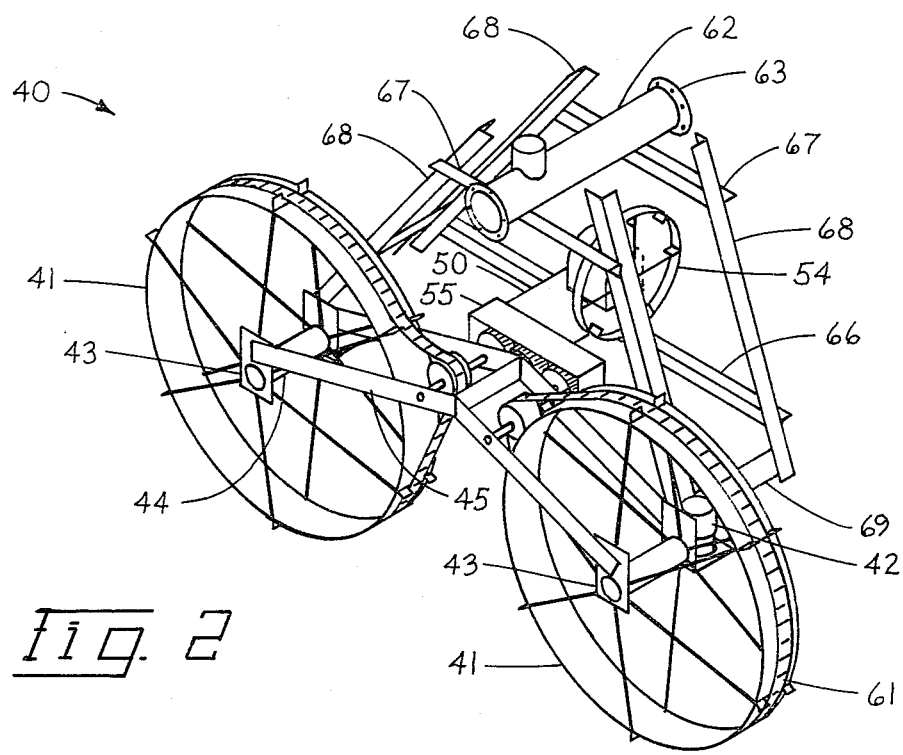
FIG. 2 is a perspective view of the pivot wheeled end carriage.
Figure 7:
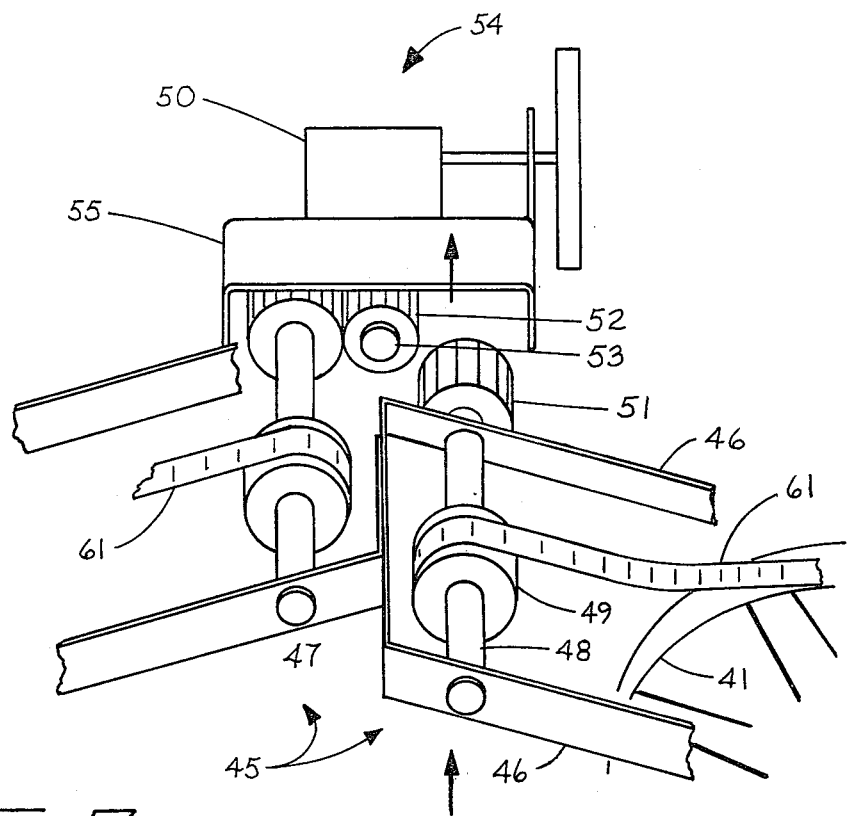
FIG. 7 is a cut-away oblique view of the end carriage drive gear and chain belt.

The revolving irrigation carriage 40 is shown in FIG. 2. The carriage 40 supports the irrigation pipeline on a metal frame structure upon which the two carriage wheels 41 are mounted. The carriage frame, as shown by FIG. 2 has two upper horizontal structural members 67 which support the irrigation pipeline. The upper horizontal structural members 67 are parallel and aligned in a direction perpendicular to the axis of the irrigation pipeline 62. Positioned immediately beneath each of the upper horizontal structural members is a lower horizontal structural member 66. The upper and lower horizontal structural members 66, 67 are connected at either end by a diagonal structural member 68 by welding, bolting or other attachment means well known in the art. The lower horizontal structural members 66 are attached to one another at either end by cross structural members 69 by welding, bolting or other attachment means. The irrigation pipeline 63 is attached to the upper horizontal structural members by means of brackets, welding or other attachment means well known in the art. The lower horizontal structural members 66 support the carriage drive motor which in the preferred embodiment shown in FIG. 2 consists of a water-driven turbine 54. The lower horizontal structural members 66 also support a reduction gear box 50 and irrigation drive gear housing 55. Each carriage wheel 41 is attached to the carriage frame structure by means of a pivot 42 which is bolted, welded or otherwise attached to a lower corner of the frame structure as shown in FIG. 2. Each wheel is also connected to a U-shaped wheel brace 45 which consists of two wheel brace elongate members 46 welded to a wheel brace cross member 47 as shown in FIG. 7. The open ends of the U-shaped wheel brace 45 are welded or otherwise attached to the two axle plates 43 on each wheel as shown in FIG. 2.

A drive chain pulley 49 is suspended between the wheel brace elongate members 46 of each U-shaped wheel brace 45 near the upper end of each U-shaped wheel brace 45 as shown in FIGS. 2 and 7. The drive chain pulley 49 is mounted on a drive chain gear shaft 48 which is rotatably attached through the U-shaped wheel brace elongate members 46. A first gear 51 is attached to the gear shaft 48 on the side near the carriage frame. A second gear 52 mounted on a second gear shaft 53 which is in turn drivingly connected to the reduction gear box 50 is operably mounted within the drive gear housing 55. As shown in FIGS. 2 and 7, the first gears 51 mesh with the second gear 52 when the irrigation system is in the irrigation mode. Bolts or a simple locking mechanism (not shown) located on the U-shaped wheel brace cross member 47 hold the carriage wheels 41 and gears 51, 52 in proper position during irrigation. Rotational motion from the water-driven turbine is thus transmitted through the reduction gear box 50 and the first and second gears 51, 52, to the drive chain pulley 49 which in turn rotates the drive chain belt 61 to rotate the carriage wheels 41. A more detailed explanation of the operation of the water driven turbine and associated gear mechanisms is found in Emrich patent application Ser. No. 129,088, which has been incorporated by reference above.

Figure 4:
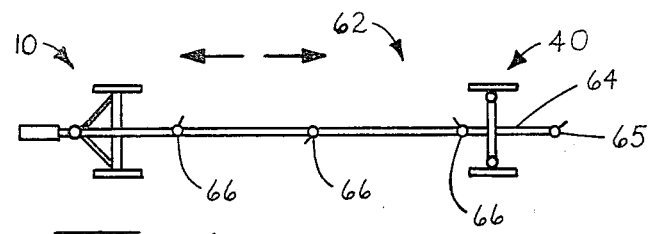
FIG. 4 is a simplified top view showing the direction of motion in the mobile mode.
Figure 5:
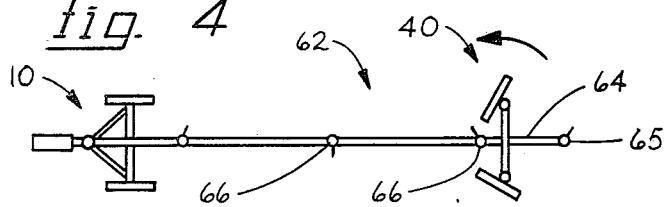
FIG. 5 is a simplified top view showing the rotation of the carriage wheels when changing from the mobile mode to the irrigation mode.
Figure 6:
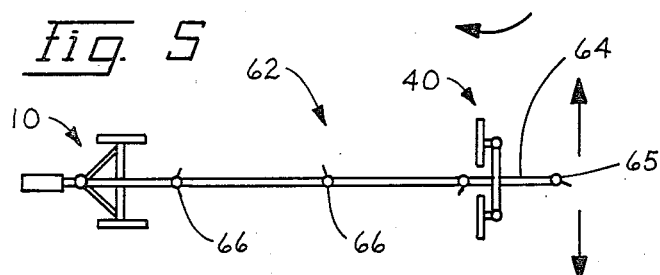
FIG. 6 is a simplified top view showing the direction of motion in the irrigation mode.

Each wheel pivot 42 allows the associating carriage wheel to rotate within an arc of approximately 90° as shown in FIGS. 4, 5, 6. During the irrigation mode, as shown in FIG. 6, the carriage wheels may be locked into position by a locking mechanism in the wheel brace cross members 47 as discussed above. While in the mobile mode, as illustrated in FIG. 4, the carriage wheels may be locked in a position perpendicular to the position of the irrigation mode by means of a detachable brace rod (not shown) operably connected to each U-shaped wheel brace and a lower horizontal structural member 66 or by means of a locking mechanism in the pivot 42 or by other conventional means which would be obvious to craftsmen familiar with the mechanical arts.

An end gun boom 64, as shown in FIGS. 4, 5 and 6, is attached to the irrigation pipe 62 at an irrigation pipe flange 63 by means of bolts, welding or other attachment means well known in the art. An end gun 65 operably attached at the end of the end gun boom may be operated to increase coverage of the field being irrigated, or to irrigate certain non-circular portions of the field being irrigated. The end gun 65 is actuated by means of a cable 19 and cam lever 18 and associated cam ring 20. A second cam lever 18 and cam ring 20 may be used to automatically shut the system down after a preselected number of revolutions or partial revolutions. The operation of the cam system for the end gun and shut-off devices are more fully discussed in Emrich patent application Ser. No. 129,088 which has been incorporated by reference above.

The center pivot carriage 10 and the revolving irrigation carriage 40 support the ends of the irrigation pipeline 62 as indicated in FIGS. 4, 5 and 6. It can be seen that in FIG. 4 the wheels 41 of the revolving carriage 40 have been positioned in a direction parallel to the axis of the irrigation pipeline; thus allowing the entire system to be towed by the self-driven center pivot carriage 10. An operator standing on a folding step 36, as shown in FIG. 1, can steer the center pivot carriage 10 by means of hand crank 26. Once the desired point in the field is reached, the drive motor of the center pivot carriage 10 is turned off and the wheels 41 of the irrigation carriage 40 are rotated as shown in FIG. 5 and locked into position as shown in FIG. 6. The water source (not shown) is then connected to the open end of the L-shaped irrigation pipe section 39. Although conventional drive motors could also be used, in the preferred embodiment, water from the irrigation water source would power the water driven turbine 54, thereby turning the wheels 41 of the irrigation carriage 40 causing the irrigation carriage 40 to rotate about the center pivot carriage 10 while dispensing water on the field through the attached sprinklers 66 and end gun 65, as shown in FIG. 6. Water may be provided by any conventional irrigation water source. In a long narrow field, a single pipeline with multiple attachments might be placed down the center of the field allowing the irrigation system to be driven from one connection point on the pipe to another, thereby watering the entire field without using multiple branch piping. It might also be feasible to connect the mobile center pivot irrigation system to a flexible pipeline such as a fire hose which could trail behind the irrigation unit when the unit is moved from one irrigation position to another.

I claim:

1. A mobile, operably and transportably self-propelled center pivot irrigation unit comprising:
    a self-driven first carriage including a plurality of ground wheels;
    an operator support station on said self-driven first carriage;
    operator controlled steering means on said first carriage at said operator station for steerably moving at least one of said ground wheels;
    an irrigation pipeline pivotally connected to said first carriage;
    irrigation water dispensing means in fluid communication with said irrigation pipeline and mounted thereon;
    a second wheel mounted carriage operably supporting said irrigation pipeline;

means for changing the direction of travel of said second wheel mounted carriage with respect to said irrigation pipeline whereby the wheels of said second carriage may be positioned to travel parallel to the axis of said irrigation pipeline and whereby the wheels of said second carriage may also be positioned to travel perpendicular to the axis of said irrigation pipeline;

means for connecting said irrigation pipeline to an irrigation water source;

a disengageable first drive means operably mounted on said irrigation unit for propelling said second carriage in a circular path about said carriage; and said first carriage including a second drive means fixedly mounted on said irrigation unit for drivingly rotating at least one of said ground wheels to propel said unit in a linear direction of travel.

2. The center pivot irrigation unit of claim 1 wherein the first wheel-mounted carriage comprises a lightweight three-wheeled carriage and wherein two of the wheels have the same fixed axis of rotation and wherein the third wheel is pivotally attached to the frame and wherein the steering means for said first carriage comprises manual steering gear operably connected to said pivotally attached wheel.

3. The mobile center pivot irrigation system of claim 1, wherein the means for changing the direction of travel of said second wheel-mounted carriage with respect to said irrigation pipeline comprises pivoting carriage wheels.

4. The mobile center pivot system of claim 1, wherein the irrigation water dispensing means comprise a plurality of sprinklers positioned at spaced intervals along the irrigation pipeline and an end gun.

5. The mobile center pivot system of claim 1 wherein said first and second carriages support the entire center pivot irrigation unit.

* * * * *